(12) United States Patent
Dekkers

(10) Patent No.: US 8,517,739 B2
(45) Date of Patent: Aug. 27, 2013

(54) METHOD TO TEACH A DYSLEXIC STUDENT HOW TO READ, USING INDIVIDUAL WORD EXERCISES BASED ON CUSTOM TEXT

(76) Inventor: Johannes Alexander Dekkers, Cranbrook (CA)

( * ) Notice: Subject to any disclaimer, the term of this patent is extended or adjusted under 35 U.S.C. 154(b) by 207 days.

(21) Appl. No.: 12/942,873

(22) Filed: Nov. 9, 2010

(65) Prior Publication Data

US 2011/0111377 A1    May 12, 2011

Related U.S. Application Data

(60) Provisional application No. 61/259,888, filed on Nov. 10, 2009.

(51) Int. Cl.
*G09B 17/00* (2006.01)
(52) U.S. Cl.
USPC .......................................................... 434/178
(58) Field of Classification Search
USPC .................................. 434/156, 157, 178, 167
See application file for complete search history.

(56) References Cited

U.S. PATENT DOCUMENTS

| | | | | |
|---|---|---|---|---|
| 3,906,644 A | 9/1975 | Levinson | | 434/184 |
| 4,045,884 A | 9/1977 | Zand | | 434/184 |
| 4,090,311 A | 5/1978 | Lyons | | 434/184 |
| 4,123,853 A | 11/1978 | Dickensheet | | 434/184 |
| 4,323,349 A | 4/1982 | Maltzman | | 434/184 |
| 4,379,699 A | 4/1983 | Nelson | | 434/184 |
| 4,643,679 A | 2/1987 | Tatum | | 434/167 |
| 4,979,902 A | 12/1990 | Morelle | | 434/184 |
| 5,114,346 A | 5/1992 | Fioramonti | | 434/184 |
| 5,277,586 A | 1/1994 | Branch | | 434/184 |
| 5,328,373 A | 7/1994 | Wood | | 434/172 |
| 5,451,163 A | 9/1995 | Black | | 434/178 |
| 5,690,493 A | 11/1997 | McAlear | | 434/178 |
| 5,795,163 A | 8/1998 | Alioto | | 434/171 |
| 5,951,298 A | 9/1999 | Werzberger | | 434/178 |
| 6,213,956 B1 | 4/2001 | Lawton | | 600/558 |
| 6,324,511 B1 | 11/2001 | Kiraly | | 704/260 |
| 6,382,791 B1 | 5/2002 | Strawderman | | 351/203 |
| 6,926,528 B2* | 8/2005 | Dolan | | 434/159 |
| 7,052,278 B2* | 5/2006 | Johnson et al. | | 434/156 |
| 7,490,033 B2* | 2/2009 | Chen et al. | | 704/1 |
| 2002/0115048 A1* | 8/2002 | Meimer | | 434/322 |

(Continued)

OTHER PUBLICATIONS

U.S. Appl. No. 09/794,430, filed Feb. 27, 2001, Barton.

(Continued)

*Primary Examiner* — Xuan Thai
*Assistant Examiner* — Peter Egloff

(57) ABSTRACT

The method extracts individual words from a source text, in sequence of occurrence, and subsequently inserts these words in a vocabulary database table. Insertion only takes place if the said table does not yet contain that particular word. When the insertion process is completed, individual words are presented to the student to exercise. When the student reaches fluency in reading individual words, the source text from which they were extracted is presented and the student is able to read the text fluently. As the student progresses, the vocabulary table grows, allowing the source texts to contain more words, as only new words are exercised. The method's advantages are: Deliver positive reading experiences within days; The ability to teach a student how to read with materials at par with the student's verbal intelligence; The ability to teach reading in a non-technical manner, very close to the normal reading experience.

7 Claims, 6 Drawing Sheets

(56) References Cited

U.S. PATENT DOCUMENTS

| | | | |
|---|---|---|---|
| 2002/0119429 A1 | 8/2002 | Barton | 434/178 |
| 2005/0069849 A1* | 3/2005 | McKinney et al. | 434/178 |
| 2005/0106539 A1* | 5/2005 | Bagley et al. | 434/169 |
| 2005/0191604 A1 | 9/2005 | Allen | 606/153 |
| 2008/0280271 A1* | 11/2008 | Symmes | 434/169 |
| 2010/0153889 A1 | 6/2010 | Krause | 715/856 |
| 2011/0076653 A1* | 3/2011 | Culligan et al. | 434/157 |

OTHER PUBLICATIONS

U.S. Appl. No. 10/444,809, filed May 22, 2003, Cytanovich.
U.S. Appl. No. 10/528,321, filed Sep. 15, 2003, Guffanti.
U.S. Appl. No. 10/789,654, filed Sep. 1, 2005, Allan.
U.S. Appl. No. 10/621,334, filed Jul. 18, 2003, Watkins.

* cited by examiner

METHOD TO TEACH A DYSLEXIC STUDENT HOW TO READ, USING INDIVIDUAL WORD EXERCISES BASED ON CUSTOM TEXT

CROSS-REFERENCE TO RELATED APPLICATIONS

This application follows Provisional Patent Application No. 61/259,888, eFiled by the present inventor on 10 Nov. 2009, under EFS ID 6428714, EFS confirmation number 1388.

STATEMENT REGARDING FEDERALLY SPONSORED RESEARCH OR DEVELOPMENT

There is no federally sponsored research or development related to the invention.

REFERENCE TO SEQUENCE LISTING, A TABLE, OR A COMPUTER PROGRAM LISTING COMPACT DISC APPENDIX

There is no Sequence Listing, Table, or Computer Program Listing Compact Disc Appendix.

BACKGROUND OF THE INVENTION

1. Field of the Invention

The present invention relates to a method for the treatment of conditions such as Dyslexia.

2. Background of the Invention

Dyslexia is a general term for a reading disorder which affects the ability to read. Developmental Dyslexia relates to a dyslexic condition from birth. Acquired Dyslexia relates to a dyslexic condition due to brain damage (accident, brain hemorrhage; other). Circa 80% of the developmental dyslexic community may be grouped in the sub-category of those suffering Phonological Processing Disorder. Compared to their peers, individuals with Phonological Processing Disorder are less able or unable to phonologically decode words (to 'sound out' words). The present invention is developed for the treatment of developmental students suffering Phonological Processing Disorder.

In the late 1800's scientists in England (Dr. W. Pringle Morgan), and Germany (Dr. Adolf Kussmaul) first formally diagnosed and labelled the condition. It was labelled "word-blind". Over the next Century, the quest to understand the underlaying causes has covered all four relevant fields of science: Ophthalmology; Neurology; Cognitive sciences; Educational psychology; Behavioral Sciences.

Research aimed at producing computer models that resemble the functioning of the human brain when reading written text, has resulted in consensus on the existance in the human reading system of two separate procedures for reading: in other words, the existance of two main routes—dual routes—that bring a reader from print to speech. These so-called Dual route models demonstrate the existance of a lexical (dictionary) route, and a non-lexical route aimed at coupling phonemes (the small distinct sound units in a given language, such as /k/ in 'cat') to the initial orthography (letter shapes) and graphemes (smallest units relating to specific phonemes, such as 'ph' relates to /f/). This body of scientific research evidences that impairment of the non-lexical (grapheme-to-phoneme) route results in symptoms identical to those of individuals suffering a phonological processing disorder. Australian Prof. Max Coltheart has been a leading scholar in this research (Coltheart, M., Rastle, K., Perry, C., Langdon, R., & Ziegler, J. (2001). DRC: A dual route cascaded model of visual word recognition and reading aloud. Psychological Review, 108, 204-256. doi: 10.1037/0033-295X.108.1.204).

More recently, breathtaking scientific research in the field of Neurology has made it possible to accurately map those areas in the brain that are involved in reading. Using functional magnetic resonance imaging (fMRI) it has been established that the Broca's area, Inferior Frontal Gyrus, is responsible for a relatively slow process of articulation and word analysis. The Parieto-temporal area is also responsible for word analysis: it is believed to analyse a word, pull it apart, and link its orthography (letters) to sounds. The third area, Occipito-temporal area, is the express pathway to reading open to the skilled reader. This Occipito-temporal area reacts almost instantly to the whole word as a pattern—identifying the word by sight. There are therefore three neural pathways for reading: Two slower, analytical ones, that are used mainly by beginning reades, and an express route, the Occipito-temporal, relied on by experienced, skilled readers.

Dyslexic readers show a fault in the system: Underactivation of neural pathways in the back of the brain. Consequently, they have initial trouble analyzing words and transforming letters into sounds. (Shaywitz, Sally. Overcoming Dyslexia: A New and Complete Science-Based Program for Reading Problems at Any Level. 1st. New York: Vintage Books, 2003. 75-92. Print.).

How is Dyslexia Treated.

A review of Prior Art demonstrates a predominance of four different treatment approaches in treating Dyslexia. The following paragraphs briefly discuss the governing principles behind these approaches, and do so from the perspective of the needs of developmental dyslexics suffering Phonological Processing Disorder.

Sight-Reading Treatment Approach.

Examples of Printed materials-based Dyslexia treatments.

| Name | Publisher | Review |
|---|---|---|
| ReadingKEY | ReadingKEY | http://readingkey.com/ |
| Key Words Reading | Ladybird Books | http://en.wikipedia.org/wiki/Key_Words_Reading_Scheme |

These are approaches which—at the core—relay on sight reading of whole words. These approaches ask the student to commit to memory individual whole words. They either present lists of words (common English words) or work with readers based on gradually expanding sight reading vocabulary. ReadingKEY is an example of a method based on lists of words. The disadvantage of this approach is that the student is presented with hundreds upon hundreds of words which the student is asked to memorize. It takes a long time before the students knows enough words to be able to read a text. And even when a text is presented, a certain number of words will not yet be present in the student's whole word memory bank, making it impossible for the student with Phonological Processing Disorder to decode and sound out the word.

And example of an approach deploying readers based on gradually expanding sight reading vocabulary is the well-known series of readers of "Peter and Jane" by Ladybird Books. Because the child does not know any words yet, the books start with infantile language. "Here is Peter", "Peter is here", "Here is Jane", "Jane is here", "I like Peter", "I like Jane". Additional words are introduced gradually, page by page, to expand the reader's reading vocabulary. For a 4 or 5 year old, learning to read, this approach is quite acceptable. But for a 9 year old who has dropped behind school due to struggles in learning how to read, this approach is embarassing. Dyslexia is unrelated to intelligence. Many dyslexics demonstrate above average skills in cognitive abilities. They have learned to cope with their inability to read. Their verbal intelligence and verbal vocabulary is typically not lacking behind their peers at all. To ask an already frustrated and embarrased 9 year old to read Baby language will not generate the motivation required to overcome Dyslexia. The reader topic and concepts being far below the verbal intelligence levels of the typical 7 to 9 year old dyslexic child.

Grammar and Phonics Treatment Approach.

These are intervention approaches primarily aimed at enhancing awareness of and ability in decoding any or all of the components comprising written language: letters, spelling, phonology, and morphology.

Example of a USA Patent.

| U.S. Pat. No. | Issue Date | Patentee | Relevant Pages |
| --- | --- | --- | --- |
| 5,451,163 | Sep. 19, 1995 | Black | Abstract; p5. col 2:50f. |

Examples of USA Patent Applications.

| U.S. Pat. No. | Filing Date | Inventor | Relevant Pages |
| --- | --- | --- | --- |
| 9,794,430 | Feb. 27, 2001 | Barton | Abstract |
| 10,444,809 | May 22, 2003 | Cytanovich | Abstract |
| 10,528,321 | Sep. 15, 2003 | Guffanti | Abstract; p24. [0004] |

Examples of Printed materials-based Dyslexia treatments.

| Name | Publisher | Review |
| --- | --- | --- |
| Lindamood-Bell | Lindamood-Bell | http://www.lindamoodbell.com/programs/index.Aspx |
| Reading Mastery | McGrawHill SRA | http://www.auburn.edu/academic/education/reading_genie/sra.html |

Though proponents of this treatment approach argue that training dyslexics in phonics is essential, the neurological reality of students with significant (i.e. profound) levels of Phonological Processing Disorder makes it untenable. Such students simply lack the neurological hardware to process phonics instruction.

Multi-Sensory (Touch, See, Handle, Associate) Treatment Approach.

These treatment methods deploy the use of physical objects or computer games aimed at increasing multi-sensory (touch, see, handle, associate) learning. These treatment methods typically—and intrinsically—focus on developing student orthographic (letter-shape) and phonemic awareness.

Examples of USA Patents.

| U.S. Pat. No. | Issue Date | Patentee | Relevant Pages |
| --- | --- | --- | --- |
| 4,045,884 | Sep. 06, 1977 | Zand | Abstract; p3. col 2:5f. |
| 4,090,311 | May 23, 1978 | Lyons | Abstract |
| 4,123,853 | Nov. 07, 1978 | Dickensheet | Abstract |

-continued

| U.S. Pat. No. | Issue Date | Patentee | Relevant Pages |
| --- | --- | --- | --- |
| 4,323,349 | Apr. 06, 1982 | Maltzman | Abstract |
| 4,643,679 | Feb. 17, 1987 | Tatum | Abstract |
| 5,114,346 | May 19, 1992 | Fioramonti | Abstract |
| 5,277,586 | Jan. 11, 1994 | Branch | Abstract |
| 5,328,373 | Jul. 12, 1994 | Wood | Summary p8. col 4:35f. |
| 5,690,493 | Nov. 25, 1997 | McAlear | Abstract |
| 5,795,163 | Aug. 18, 1998 | Alioto | Abstract |
| 5,951,298 | Sep. 14, 1999 | Werzberger | Abstract; p20. col 14:30f. |

Example of a USA Patent Application.

| U.S. Pat. No. | Filing Date | Inventor | Relevant Pages |
| --- | --- | --- | --- |
| 10,789,654 | Feb. 27, 2004 | Allen | p17. [0010] |

Example of a Computer-based Dyslexia treatment.

| Name | Publisher | Review |
| --- | --- | --- |
| SoundReading | Sound Reading Solutions | http://www.soundreading.com |

Though multi-sensory approaches offer the advantage that more parts of the brain are active in the treatment, they remain ineffective for students with suffering Phonological Processing Disorder.

Medical Intervention Treatment Approach.

The medical intervention approach aims at overcoming physical realities, such as pertaining to neurology or optometry.

Examples of USA Patents.

| U.S. Pat. No. | Issue Date | Patentee | Relevant Pages |
| --- | --- | --- | --- |
| 3,906,644 | Sep. 23, 1975 | Levinson | Abstract |
| 4,379,699 | Apr. 12, 1983 | Nelson | Abstract |
| 4,979,902 | Dec. 25, 1990 | Alix Morelle | Abstract |
| 6,213,956 | Apr. 10, 2001 | Lawton | Abstract |
| 6,324,511 | Nov. 27, 2001 | Kiraly | Abstract |
| 6,382,791 | May 7, 2002 | Strawderman | Abstract |
| 6,443,572 | Sep. 03, 2002 | Lawson | Abstract |

Example of a USA Patent Application.

| U.S. Pat. No. | Filing Date | Inventor | Relevant Pages |
| --- | --- | --- | --- |
| 10,621,334 | Jul. 18, 2003 | Watkins | p5. [0013], [0016] |

Examples of Computer-based Dyslexia treatments.

| Name | Publisher | Review |
| --- | --- | --- |
| Fast ForWord | GemmLearning | http://www.gemmlearning.com/Dyslexia_help.php |
| Dybuster | Dybuster AG | http://www.dybuster.com/int/learning-system/supervised-learning-by-playing/ |

Prior to the aforementioned breakthroughs in neurology these methods primarily focussed on addressing the opthalmological aspects of certain forms of Dyslexia, with its causes in the anatomy, physiology and diseases of the eye, and its brain processing centers. An example of this is the invention of Levinson et all. (USPTO U.S. Pat. No. 3,906, 644, Issued Sep. 23, 1975), which aims to present presentation of reading material in letter or word-sized units, one at a time, to induce static visual scanning and processing of the read matter. Normal reading requires sequential scanning (letters and words from left to right, in sequence), which is difficult for some dyslexics.

Since the aforementioned breakthroughs in neurology, new revolutionary methods have been developed. These methods seek to address the challenge of Dyslexia at its root-cause level: Missing hardware (neural paths) in and between those three primary regions of the brain used in reading. An excellent example hereof is Fast ForWord of Gemm Learning (http://www.gemmlearning.com/Dyslexia_help.php).

Though fascinating, medical intervention treatment methods fall outside the scope of the present invention.

Other Treatment Approaches.

Other treatment approaches remain which can not clearly be placed in either one of the four previously discussed treatment method categories.

Examples of USA Patents.

| U.S. Pat. No. | Issue Date | Patentee | Relevant Pages |
|---|---|---|---|
| 5,366,377 | Nov. 22, 1994 | Miller | Summary p3. col 2:38f. |
| 6,075,968 | Jun. 13, 2000 | Morris | Abstract; p15. col 4:50f. |
| 6,506,057 | Jan. 14, 2003 | Benitez | Abstract |
| 6,632,094 | Oct. 14, 2003 | Falcon | Abstract |

Example of USA Patent Application.

| U.S. Pat. No. | Filing Date | Inventor | Relevant Pages |
|---|---|---|---|
| 11,642,600 | Dec. 21, 2006 | Kullok | Abstract |

Examples of Computer-based Dyslexia treatment methods.

| Name | Publisher | Review |
|---|---|---|
| ***Overview of different reading softwares | n/a | http://www.dyslexic.com/items.asp?Cc=READ |

The Challenge in any Dyslexia Treatment.

Irrespective of the treatment approach and method(s) selected, overcoming Dyslexia for an individual with Phonological Processing Disorder is hard work. There is no quick fix. The two most important factors in successfully Dyslexia treatment are (a) early diagnosis of the condition, and (b) persistent treatment.

Students with significant (i.e. profound) levels of Phonological Processing Disorder are particularly difficult to treat. They simply lack neurological hardware to process phonics instruction. Many such a student has been suffering under several consecutive phonics-based approaches to no avail. Leaving them deeply disillusioned, convinced of the fact they can never learn to read. Many suffer loss of self-esteem or are held responsible (in part or whole) for their failure: being charged with lack of motivation or dedication. The present invention is of particular value to this significant population in our Elementary and High Schools, as it addresses their dyslexic needs in a means at par with their verbal intelligence and cognitive abilities and rapidly restores the student's hope that reading can be mastered. The National Assessment of Educational Progress reported that 44 percent of 4th grade boys and girls were not yet fluent readers. These are shocking data given the fact that children are expected to develop into fluent readers by the end of 2nd grade (Shaywitz, Sally. Overcoming Dyslexia: A New and Complete Science-Based Program for Reading Problems at Any Level. 1st. Ed. New York: Vintage Books, 2003. 231. Print.). This is the reality which the present invention addresses.

BRIEF SUMMARY OF THE INVENTION

A primary design objective of the present invention was to develop a method which would restore student motivation. As explained in paragraph [0038] (directly above), when students go undiagnosed or untreated too long, their believe in their own ability to learn to read, and their willingness to make the significant investment in time and effort to learn to read, are low—even often impossibly low.

The present invention is a computer algorythm. The present invention first creates an empty vocabulary database table. Thereafter the operator uploads a text at par with the verbal intelligence of the student. This said text is called the source text. The present invention, subsequently to the upload of this source text, extracts each and every individual word from this source text, in sequence of occurance. Each extracted word, in sequence of occurance in the source text, is subsequently searched for in the said vocabulary database table. If the word already exists in the said vocabulary database table it is skipped. Such a word that already in the vocabulary database table has already been exercised by the student in a previous lesson: Such particular word is already part of his vocabulary, and the student can already sight read this word fluenty. If, however, the word does not exist in the said vocabulary database table, it is added to that table. The said source text and the words added to the said vocabulary database table are assigned a unique lesson identification code. The words in the said vocabulary database table, and the source text, share the same lesson identification code. Together, they form the essential components for a single lesson.

When a lesson has been prepared in the manner described in the previous paragraph [0040], a student can be invited to work with the lesson. The present invention takes all words carrying the lesson identification code pertaining to the lesson, and presents these to the student one by one to exercise in a sight reading manner. The whole word is presented, and text to speech synthesization technology or simply the pronounciation of a teacher is used to let the student hear the pronounciation of the word. The student subsequently parrots the pronounciation and speaks the word out loud. All words in the said lesson are exercised in this fashion, until the student demonstrates fluency in reading individual words.

Example. Take a source text such as the following passage. QUOTE The Honeybee is the most famous of all insects. Many books have been written about them. They live in nests called hives. They work and live together. One hive can house 20,000 bees! UNQUOTE. The present invention extracts each individual word, in sequence of occurrence, and checks in the vocabulary database if the word already exists. Thus, it extracts "the", "honeybee", "is", "most", "famous", etcetera.

Most likely, the words "the" and "is" are already in the vocabulary database. This means that the student already masters fluent sight reading of these words before the student is asked to exercise this particular lesson, as the student will already have exercised these words in a previous lesson. In this example, the words "honeybee", "most", and "famous" are new. That is: they do not yet exist in the said database table. When the present invention presents the lesson to the student, the student will be asked to sight read exercise only these individual words, until the student can fluently read them ("honeybee", "most", and "famous", etcetera). When this exercise of individual words is completed, the student is presented with the original source text, and discovers—to the student's joy—that the source text can be read fluently.

Reading fluency is of the essence in comprehension. Key to understanding the dyslexic's struggle for reading comprehension is the fact that they take too long to reach the end of a sentence and too long to finish a set of sentences that—together—present a thought or concept. When fluency drops below a certain value, the characteristics of our working memory (the integrated memory system responsible for short-term storage of information used for cognitive processing activities) make it simply impossible to comprehend what was read, as the opening words of the sentence and the earlier components of a thought or concept have already been forgotten. The challenge is further increased by the findings of Bigler, Burlingame and Lawson (H; Erin D. Bigler; Gary M. Burlingame; John S. Lawson. "Memory performance of children with dyslexia: a comparative analysis of theoretical perspectives. (Dyslexia)." Journal of Learning Disabilities. Sage Publications, Inc. 2003. HighBeam Research. 30 Dec. 2009), which establish that the majority of the dyslexic community show serial memory impairments (serial memory is that component of memory used when items are presented one at a time over the course of several seconds in a verbal or visual format).

Each lesson set of exercise words present only those words that the student does not yet know. Thus, whilst each lesson set contains the same number of words (for example: 24 new words per lesson), the accompanying reading text gets longer and longer, because the student's vocabulary is growing.

For the student struggling with Phonological Processing Disorder, the present invention offers the advantage over prior art that it resembles the normal reading experience as closely as possible—i.e. not be technical or abstract or far removed from the normal reading experience.

For the student struggling with Phonological Processing Disorder, the present invention offers the advantage over prior art that the normal reading experience is deliverable at a level at par with the student's verbal intelligence level. That is: The texts from which the student learns to read is not infantile ("Here is Peter", "Peter is here", "Here is Jane", "Jane is here", "I like Peter", "I like Jane"), vastly below the verbal intelligence level of a 7 to 9 year old student, late diagnosed or late in receiving treatment. Rather, the present invention allows for lessons to be based on real language texts at par with the student's verbal intelligence.

For the student struggling with Phonological Processing Disorder, the present invention offers the advantage over prior art that the student is equipped to experience a genuine normal reading experience—of a real text at par with the student's verbal intelligence level—typically within two days of commencement of the treatment. Profoundly delivering a restoration in motivation, which—in turn—generates the motivational basis to continue on the treatment path.

For the student struggling with Phonological Processing Disorder, the present invention offers the advantage over prior art that it consistently delivers reading fluency in the normal reading experience at par at the student's verbal intelligence. This fluency being the result of the sequence in which the present invention presents different exercises. A student first exercises and sight reads individual words with the aid of audio input, and then reads the complete text based on those words.

For the student struggling with Phonological Processing Disorder, the present invention offers the advantage over prior art that it uses computer routines to produce sequential exercises (individual words, as well as texts to read) that structurally build the student's vocabulary. In a highly motivating way (due to the fact that reading fluency is attained from day two and that all exercises are at par with the verbal intelligence of the student) the student is brought to a vocabulary of 3,000 words in the span of 150 lessons. This exposure to words in a pleasant and empowering way trains the phonological decoding mechanism in the student, equipping the student to phonologically decode words outside of the cumulative vocabulary build up during the treatment.

For older students struggling with Phonological Processing Disorder, the present invention offers the advantage over prior art that it allows for easy and automated production of custom lessons based on their jargon needs. Example. If a 15 year old student struggling with Phonological Processing Disorder desires to prepare for a Driver's License written exam, source texts from the Driver's License theory book can be uploaded, and custom lessons can be produced. The present invention thus allows the student to become fluent in reading words belonging to this jargon (steering wheel, brakes, turns, rearview mirror, etc.). As stated in paragraph [0043], fluency is of the essence for reading comprehension.

BRIEF DESCRIPTION OF THE SEVERAL VIEWS OF THE DRAWINGS

DRAWINGS 01, 02, 03 and 04 contain a working algorithm to execute the process of manipulating and storing a source text, extracting all words from the said source text, and subsequently store these words in a vocabulary database table.

DRAWING 05 contains a simplified diagram of the process of presenting words to the student to exercise. The words being extracted from the aforementioned vocabulary database table and grouped in groups pertaining to their original source text.

Figure 1:
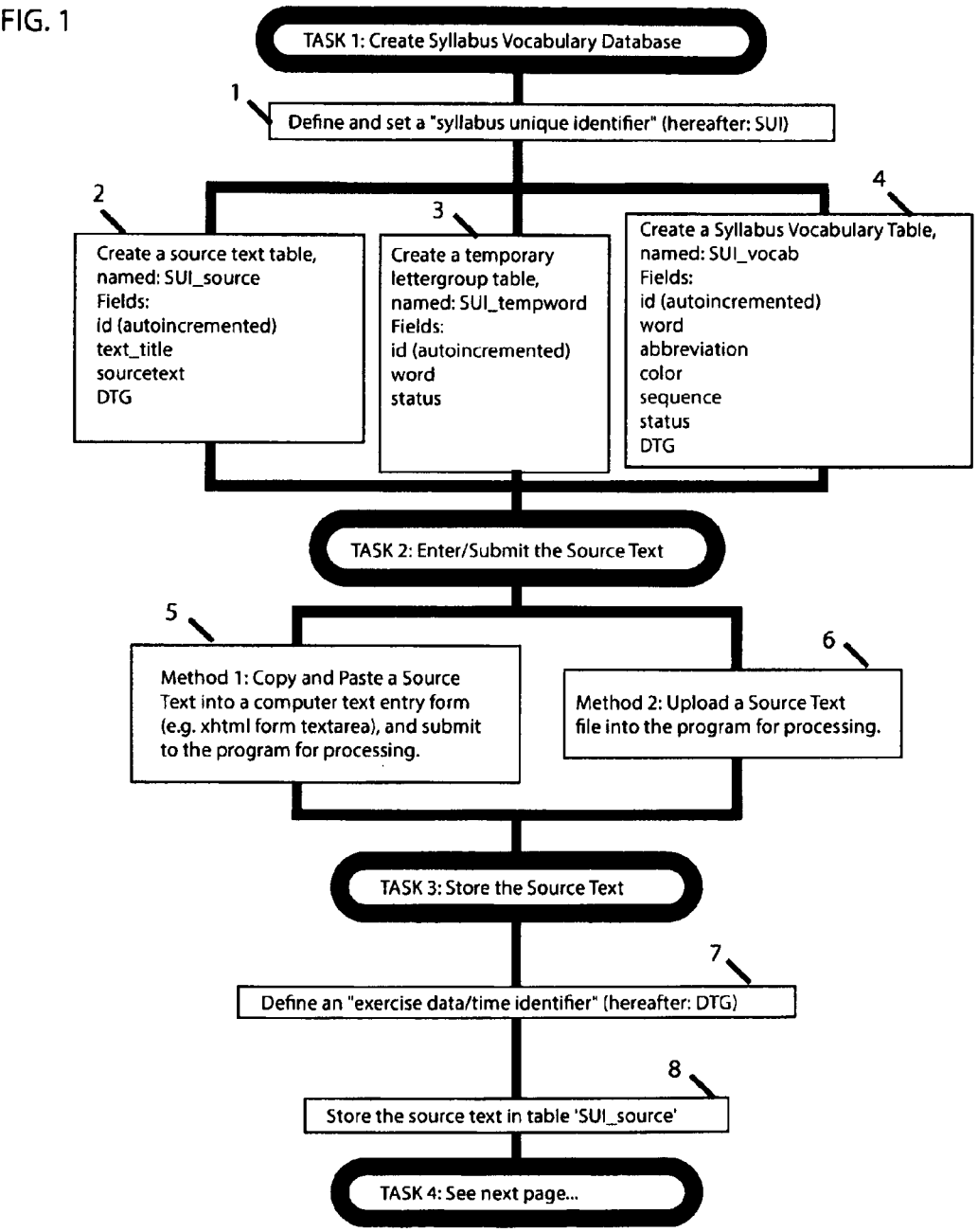
Figure 2:
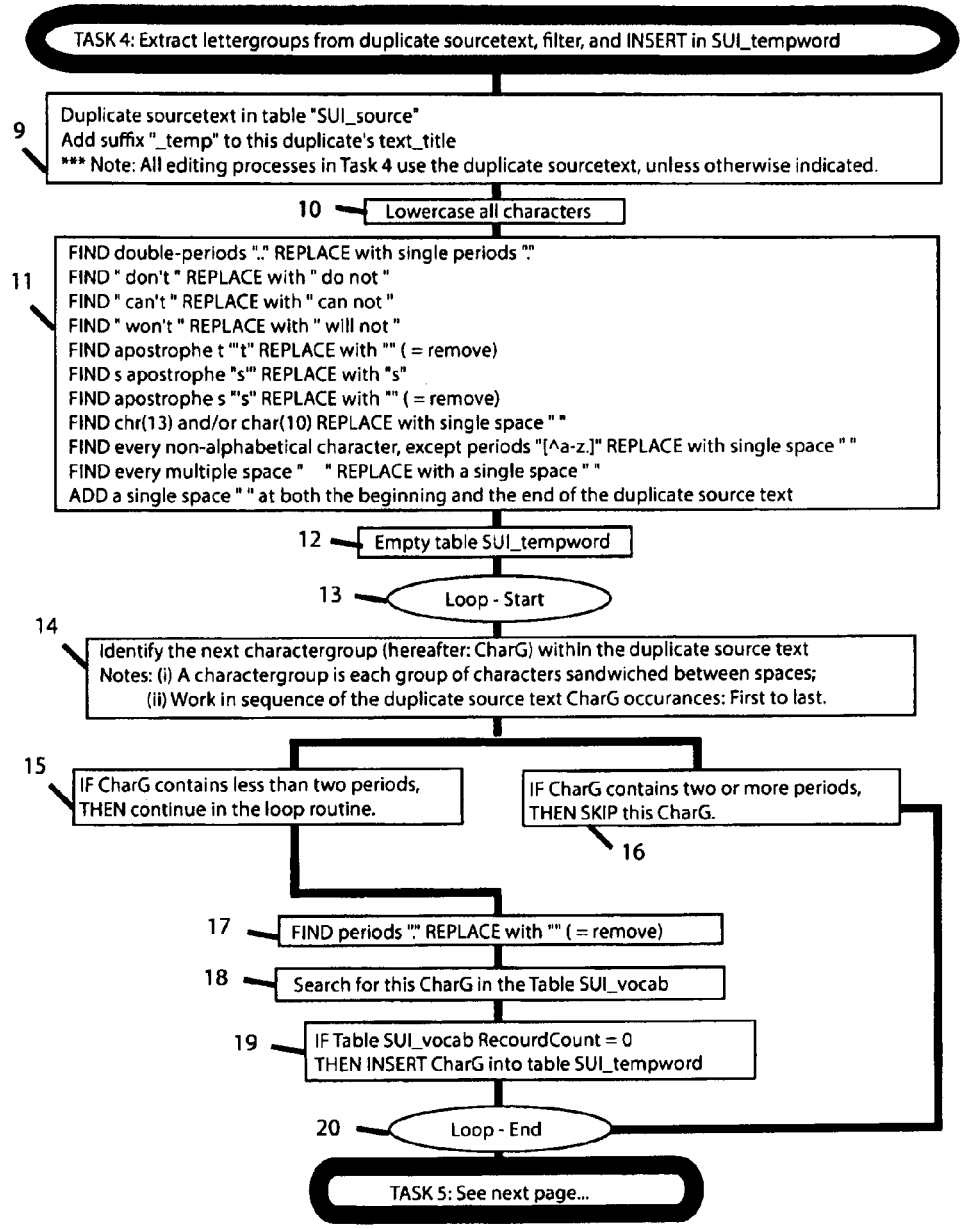
Figure 3:
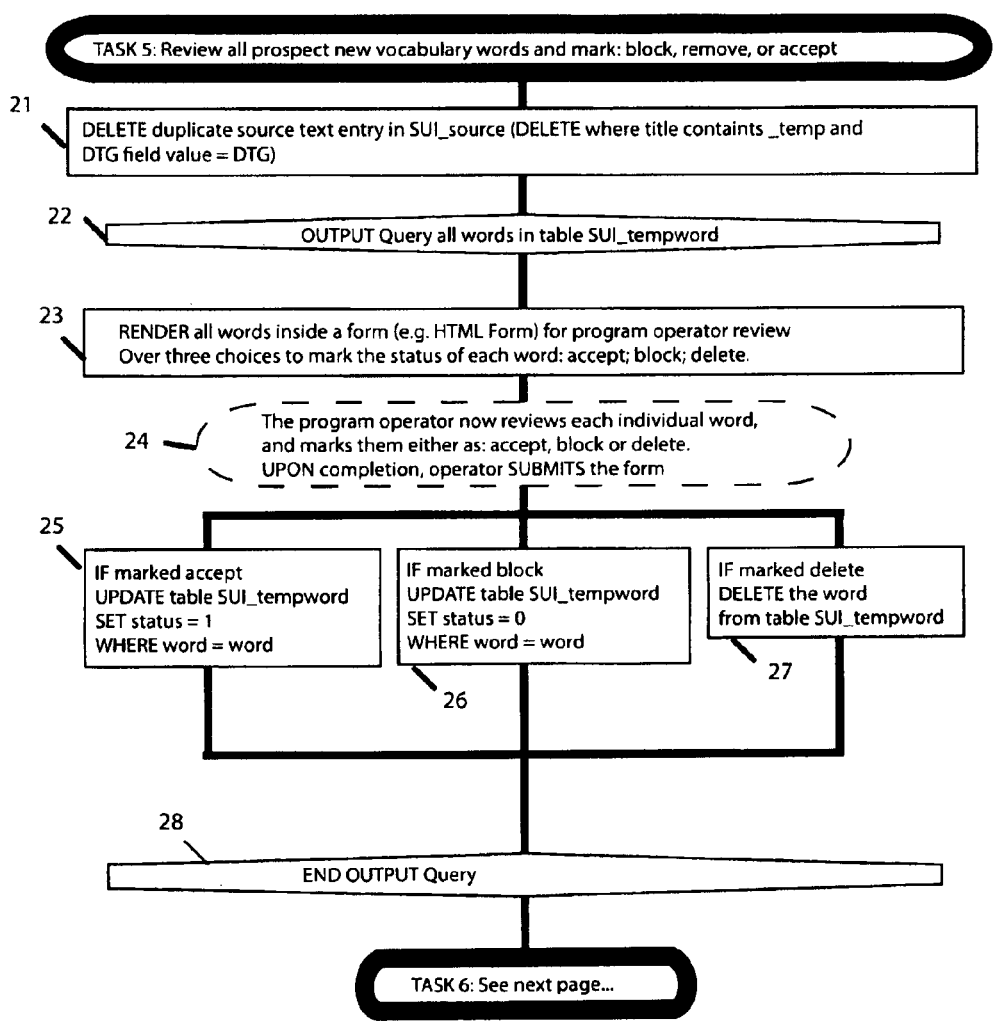
Figure 4:
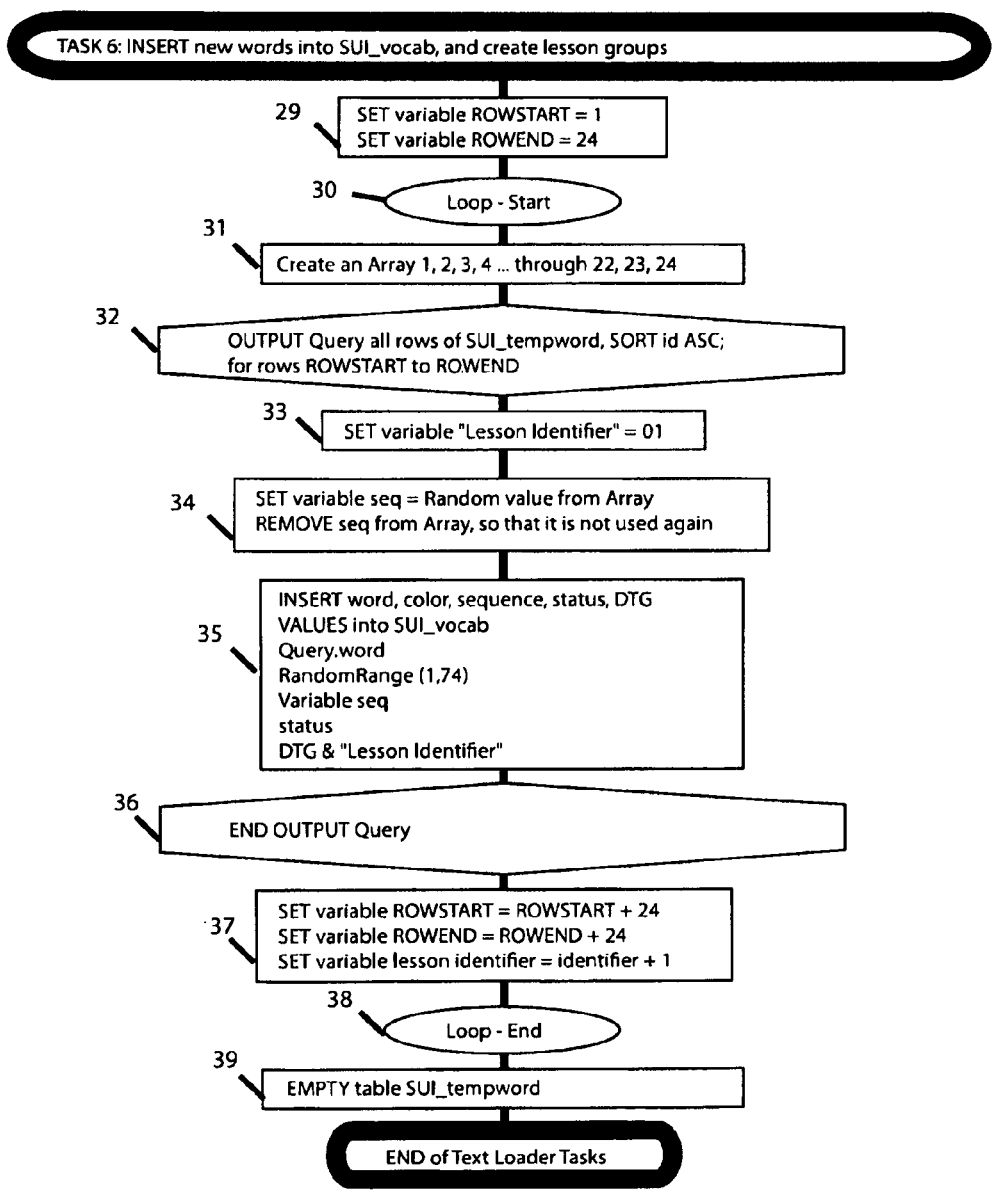
Figure 5:
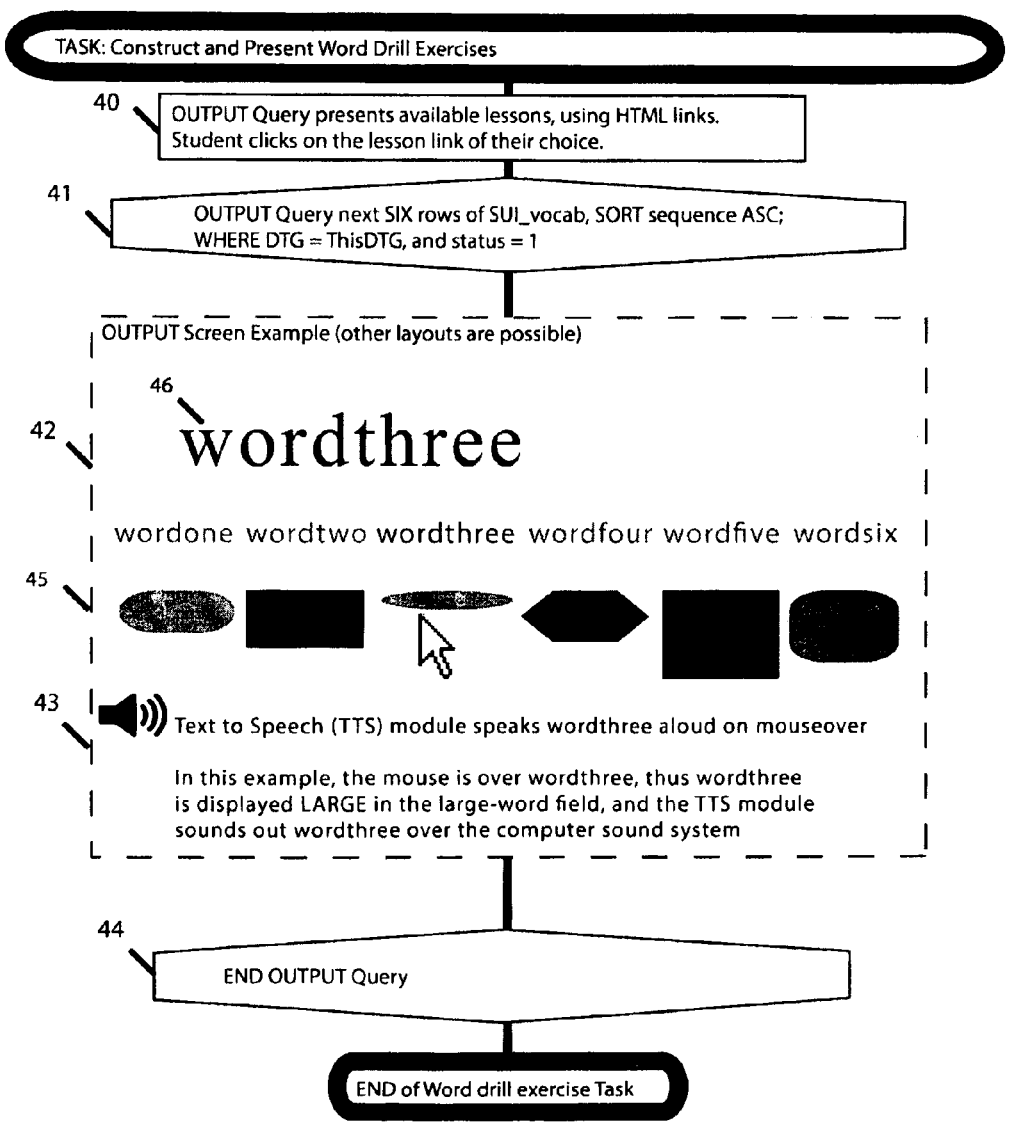
Figure 6:
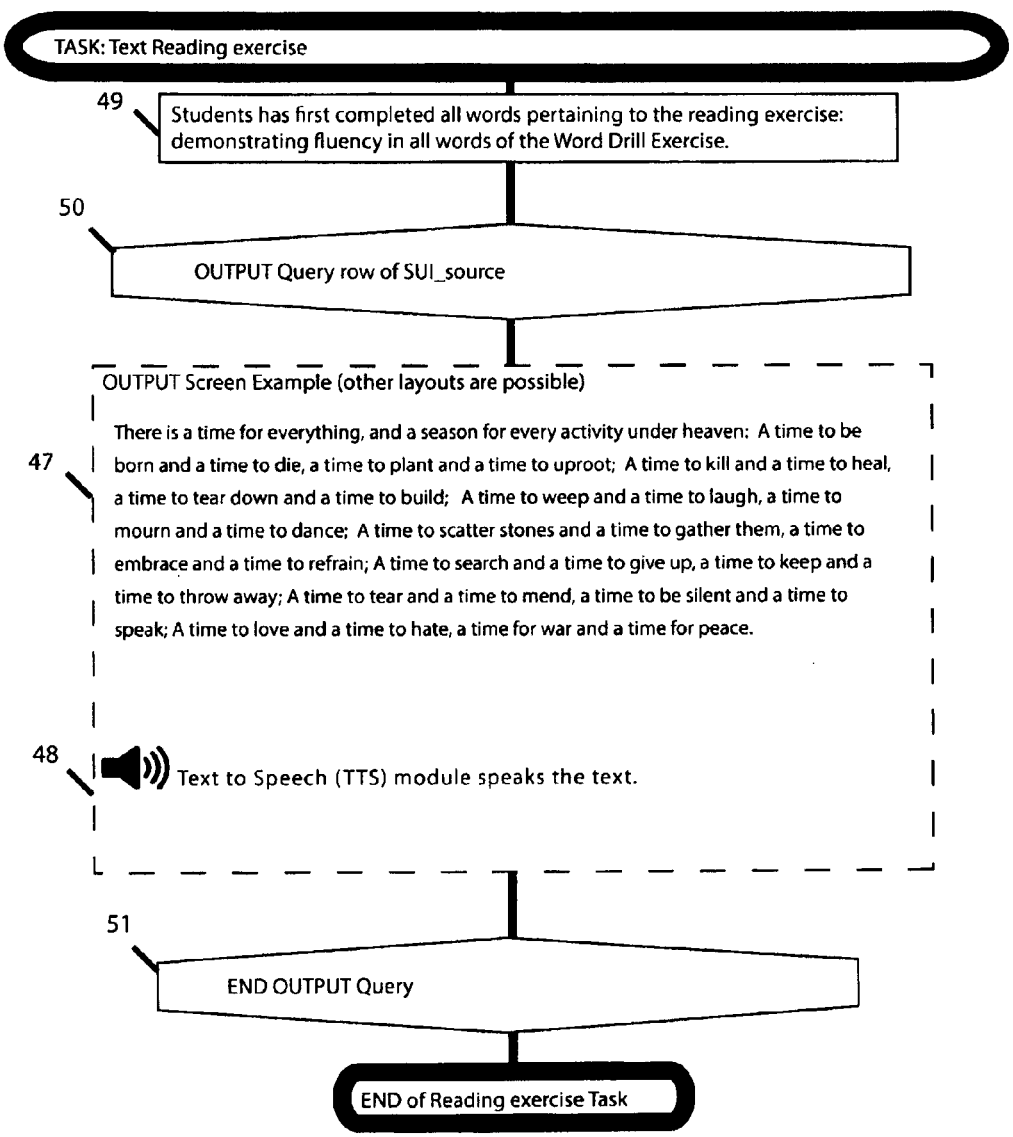

DRAWING 06 contains a simplified diagram of the process of presenting the original source texts to the student to read.

DETAILED DESCRIPTION OF THE INVENTION

The detailed description, and the algorythm contained in the drawings use database jargon based on the popular and commonly used MySQL relational database management system. Further, the detailed description, and the algorythm contained in the drawings uses HyperText Markup Language or HTML jargon, commonly used in internet web site development programming. Braced numbers in the detailed description of the present invention, such as {see 1}, pertain to the identifier numbers on the drawings.

Three Distinct Components of the Present Invention.

The present invention contains three distinct components.

Component A: Text Loader Component.

This component of the present invention allows for uploading and processing of digital source text, resulting in segmentation of the digital source text into sequential individual reading exercises or lessons, linked to groups of individual words to be exercised by the student prior to reading the associated individual reading exercise or lesson. Component A is described in detail in the descriptions below under the headers DRAWING 01 through DRAWING 04.

Component B: Word Drill Exercise Component.

This component of the present invention is responsible for the presentation of the individual words to be exercised by the student. Component B is described in detail in the description below under the header DRAWING 05.

Component C: Reading Exercise Component.

This component of the present invention is responsible for the presentation of the reading exercises to the student. Component C is described in detail in the description below under the header DRAWING 06.

DRAWING 01.

DRAWING 01 displays Tasks 1 through 3 of the present invention. Task 1: The process of extracting words from individual source texts; Task 2: The subsequent storing of these words in the syllabus vocabulary database table; Task 3: The storing of the source text.

TASK 1: Create a Syllabus Vocabulary Database.

First, a "SUI" or Syllabus-Unique-Identifier {see 1} needs to be defined. This "SUI" could for example be a unique alpha-numerical code. A preferred means to define the "SUI" is be letting the operator manually create one. Example of such a "SUI": "grade5nature". The present invention requires this "SUI" because the present invention is able to contain multiple lesson sets or syllabi: Each matching the specific needs of the different categories of students suffering Phonological Processing Disorder. One syllabus for example could contain texts that match the interest and verbal intelligence of 7 to 9 year olds. Another syllabus for example could contain texts that match the interest and verbal intelligence of 15 year old girls in High School. And yet another syllabus for example could match the needs of those seeking to write their Driver's License written exam.

Next, the present invention creates three database tables {see 2}, {see 3}, and {see 4}, and includes the SUI in the name of each table, so that these tables can be accessed by the lesson set or syllabus carrying the same SUI. The definition for each of the said three tables are specified in the following three paragraphs.

The first table {see 2} to be created is a table to store the source text. This table is named "SUI_source". Required fields are:

"id" field (=integer field; 5 digits length; autoincrementing; set as Primary Key);
"text_title" field (=varchar field; 60 digit length);
"sourcetext" field (=longtext field);
"DTG" field (=varchar field; 17 digit length).

The second table {see 3} to be created is a table to temporarily work with the individual words contained within the source text. This table is named "SUI_tempword". Required fields are:

"id" field (=integer field; 5 digits length; autoincrementing; set as Primary Key);
"word" field (=varchar field; 17 digit length);
"status" field (=char field; 1 digit length).

The third table {see 4} to be created is a Syllabus Vocabulary Table, which will contain the entire vocabulary, unique to this syllabus: word by word. This table is named "SUI_vocab". Required fields are:

"id" field (=integer field; 5 digits length; autoincrementing; set as Primary Key);
"word" field (=varchar field; 17 digit length);
"abbreviation" field (=varchar field; 17 digit length);
"color" field (=char field; 2 digit length);
"sequence" field (=int field; 2 digit length);
"status" field (=char field; 1 digit length);
"DTG" field (=varchar field; 17 digit length).

TASK 2: Enter/Submit the Source Text.

Next, the present invention is provided with a source text. A source text is any text digital text considered suitable for the student or student group. This source text could be custom-written for use in a syllabus. This source text could be acquired from an existing source. The only criteria from a computer-programming point of view is that it is digital. That is: It needs to be able to be uploaded into the present invention, through a HyperText Markup Language or HTML Form submission process.

A preferred means for uploading the source text is using an HTML Form Textarea. The source text is copy/pasted into the form textarea and subsequently submitted {see 5}.

An equally suitable preferred means for uploading the source text is using an HTML Upload routine, such as an <input type="file"> routine, in which the user browses to the file location and the file is subsequently submitted {see 6}.

TASK 3: Store the Source Text.

Next, the present invention creates a variable value consisting of the Date/Time of the operation {see 7}. This so-called date/time stamp is named "DTG". An example of the said DTG looks like this: "20100806_114641", where this specific DTG variable was created on 6 Aug. 2010, at 11:46:41 (HH:mm:ss) local time.

Next, the present invention stores the source text in the said "SUI_source" table {see 8}. The preferred means to do so is as follows: Create a new table row in "SUI_source";
Next, using HTML <input type="text" name="texttitle"> submit a Text Title. For example "Lesson_01_Welcome";
Next, set the row "text_title" field to the value of the said textTitle submit;
Next, set the row "sourcetext" field to the HTML form value described in paragraph [0066] (=textarea value), or [0067] (=file upload);
Next, set the row "DTG" field value to the "DTG" described in paragraph [0068].

DRAWING 02.

DRAWING 02 displays Task 4 of the present invention: The process of extracting words from individual source texts, and subsequently storing these words in the said Syllabus Vocabulary Table {see 4} defined in paragraph [0064].

Background to Task 4.

In this task, the present invention needs to identify and extract each and every individual word from the source text, check if it is already present in the Syllabus Vocabulary Table, named "SUI_vocab" {see 4} and, if not, add it to the said Syllabus Vocabulary Table "SUI_vocab".

In that process, however, we are hindered by the fact that the source text contains all sorts of punctuations, graphical signs, abbreviations, and other typographies not belonging to a word dictionary exclusively containing individual words. Thus, these punctuations, graphical signs, abbreviations, and other typographies need to be filtered out.

In TASK 4 we focus on this filtering process, and subsequent storage of each and every word not yet already present in the Student Vocabulary Table, named "SUI_vocab" {see 4}. We store these new unique words first inside the syllabus-unique temporary table {see 3}, named "SUI_tempword" and defined in paragraph [0063]: Not yet in the student vocabulary table, named "SUI_vocab".

TASK 4: Extract Letter Groups from Duplicate Sourcetext, and INSERT in Table "SUI_Tempword".

First, the present invention duplicates the source text that was originally stored the step described in paragraph [0069]. This duplicate source text is required to allow modification of it and filtering, without loosing the original source text. The duplicate source text {see 9} is stored in a row in said table "SUI_source". The preferred means to do so is as follows:

Create a new table row in "SUI_source";

Next, set the row "text_title" field to the value of the "text_title" field of the original source text, but appended with "_temp". Example: The original source text "text_title" field value is "Lesson_01_Welcome". Hence, the value of the "text_title" field in the new row created to store the duplicate source text will be "Lesson_01_Welcome_temp";

Next, set the row "sourcetext" field to the value of the "sourcetext" field of the row containing the original source text;

Next, set the row "DTG" field value to the "DTG" field value of the row containing the original source text.

Note: The suffix '_temp' is added to allow identification of the duplicate source text. The present invention needs to retain the original source text, including all its punctuations, graphical signs, abbreviations, and other typographies, as we need the said original source text for the presentation of the reading exercises (see DRAWING 06).

Next, the present invention calls the duplicate "sourcetext" stored in the process described in paragraph [0074] and executes a series of modifications as specified below in paragraphs [0077] and [0078].

In the duplicate sourcetext called in [0076], set all characters to lowercase {see 10}.

Next, in the duplicate sourcetext called in [0076], the present invention runs a series of FIND and REPLACE routines {see 11}, which have the objective to leave us with individual words only, void of non-alphabetical characters except the single period. The present invention also removes all multiple spaces. Lastly, the present invention adds a space at the very beginning and very end of the source text to assure that the opening and closing word of the source text is not missed. The preferred means to do all of the FIND and REPLACE routines described in this paragraph is as follows:

FIND double-periods " . . . " REPLACE with single periods ".";

Next, FIND "don't" REPLACE with "do not";

Next, FIND "can't "REPLACE with" can not";

Next, FIND "won't "REPLACE with" will not";

Next, FIND apostrophe t "'t" REPLACE with " " (=remove);

Next, FIND s apostrophe "s'" REPLACE with "s";

Next, FIND apostrophe s "'s" REPLACE with" " (=remove);

Next, FIND chr(13) and/or char(10) REPLACE with single space " ";

Next, FIND every non-alphabetical character, except periods "[^a-z.]" REPLACE with single space " ";

Next, FIND every multiple space ""REPLACE with a single space"";

Next, ADD a single space " " at both the beginning and the end of the duplicate source text.

Next, the present invention empties the SUI temporary table "SUI_tempword" {see 12}, that is: all rows in "SUI_tempword" are deleted.

Next, the present invention starts a LOOP routine, which runs all steps described in paragraphs [0081] upto and including [0085], from start {see 13 } to ends {see 20}.

The present invention takes the duplicate sourcetext called in [0076] and subsequently modified in [0077] and [0078] and performs a LIST count, where the list separator is a SPACE " " {see 14}. The count result will be equivalent to the total number of individual words or charactergroups in the said duplicate sourcetext.

Note: A charactergroup is a group of characters not equivalent to a normal word.

Example: The abbreviation "e.g." will have survived the FIND/REPLACE routine described in paragraph [0078], but does not constitute a word proper.

Note: Drawings 02 and further depict both individual word and charactergroup by the abbreviation "CharG".

Next, it calls the first LIST occurance, that is: it calls the first individual word or charactergroup {see 14}, and performs the steps described in paragraphs [0082] through [0085]. When the LOOP routine [0080] repeats for the next round, it adds 1 to the LIST occurance position. The result being, that the present invention will perform the steps described in paragraphs [0082] through [0085] for each individual word or charactergroup in the said duplicate sourcetext: One individual word or charactergroup at a time, in sequence of occurance in the said sourcetext.

IF the individual word or charactergroup contains less than two periods, THEN continue in the loop routine to the next step described in paragraph [0084] below {see 15}.

IF the individual word or charactergroup contains two or more periods (that is: all words not identified and acted upon by the routine described in paragraph [0082] directly above), THEN skip this charactergroup and proceed to the LOOP end, and loop back to the LOOP start to work with the next word or charactergroup in the LIST sequence {see 16}. A value of 1 will be added to the LIST Get At routine, such that the next word or charactergroup in the LIST is identified and called.

Next, for the word that has been identified and acted upon in the IF/THEN process described in [0082], FIND and DELETE the period {see 17}. Why? Words at the end of a sentence, directly followed by a period, such as "end." in a sentence concluding with "this is the end.", are a charactergroup (i.e. three letters plus a period). The period needs to be removed, to leave us with a proper word, being "end". A word without a period will be identified and acted upon as well: however, since there is no period, the word remains unchanged.

Next, search for this individual word or charactergroup in the Syllabus Vocabulary Table, named "SUI_vocab" {see 18}.

Next, IF the said search described in [0085] results in a record count of zero (i.e. this individual word or charactergroup does not exist in table "SUI_vocab", THEN INSERT this individual word or charactergroup in the table "SUI_tempword" (note: not yet in the table "SUI_vocab", but in the table "SUI_tempword"). If this individual word or charactergroup does exist in "SUI_vocab", no action is taken.

This action completed the loop routine defined in paragrapg [0080].

IF the loop count equals the LIST count defined in paragraph [0081], THEN the loop routine is escaped or terminated, and the present invention continues or progresses to Task 5 {see 20}.

IF the loop count is less than the LIST count defined in paragraph [0081], THEN the loop routine continues in its next loop round. A value of 1 will be added to the LIST Get At routine, such that the next word or charactergroup in the LIST is identified and called {see 20}.

DRAWING 03.

DRAWING 3 displays Task 5 of the present invention. Task 5 has as its objective to review all the individual words or charactergroups and either block, remove or accept them.

Background to Task 5.

As the present invention is able to work with real texts as the source for student word drill exercises, the filtering and FIND/REPLACE processes of Task 4 will leave us with words or charactergroups that have no relevance in the vocabulary of a student. Example. The abbreviation "Mr." will come through the said filtering and FIND/REPLACE process as "mr". There is no need for this CharG or word to be trained by the student. Nor do we want to have to be confronted with this word in future when we are processing new source texts. Hence, we need a means to manually review all individual words or charactergroups at this point in the process, manually determining and indicating if an individual word or charactergroup needs to be accepted and thus added to the "SUI_vocab" and become part of the syllabus' word drill exercises, or be blocked, or simply removed i.e. deleted. The operator should accept the word, if the word needs to be included in the word exercises.

The operator should block the word, if the word or charactergroup should not be included in word exercises, and should never again be considered to be included in the context if this particular syllabus.

The operator should remove i.e. delete the word if it is deemed to be a singular occurance of an irrelevant charactergroup not to be exercised in the word exercises.

Task 5: Review all Prospect New Syllabus Vocabulary Words and Mark: Accept, Block, or Remove.

First, the present invention deletes the duplicate source text {see 21} from the table "SUI_source" table, as there is no further need for it. The preferred means to do this is by running a DELETE query for a row in table "SUI_source", WHERE "DTG" value is identical to this syllabus "DTG" value, and where "text_title" contains "_temp".

Next, the present invention starts runs a QUERY, {see 22} and {see 28}, which will output all the individual words or charactergroups that are present in the table "SUI_tempword".

The output of the said QUERY described in [0090] will be rendered or presented inside a HyperText Markup Language (HTML) Form {see 23}, to enable the program operator to review each and every individual word {see 24}. The words will be rendered together with a means to mark each individual word in one of the following three ways: Accept, Block, or Delete. The preferred means is as follows:

An HTML table structure is used to render all individual words or charactergroups contained in the "SUI_tempword". One word or charactergroup per table row. Each word or charactergroup is accompanied by three HTML Form Input Radio Buttons (input type="radio"). One for each of the three mark options: Accept, Block, or Delete. It is preferred if the radio button option "Accept" is checked i.e. the default mark. At the bottom of the said HTML table, a SUBMIT button is added.

The operator reviews the table, word or charactergroup, and sets the said radio button per word or charactergroup to the desired mark (accept, block, or remove) {see 24}. When all individual words or charactergroups have been reviewed and marked, the operator clicks SUBMIT and activates the HTML Form submission.

The present invention receives the said HTML Form and processes the said Form in the following preferred means.

IF a word or charactergroup is marked "Accept", THEN UPDATE table "SUI_tempword", SET status="1", WHERE word=(the specific word in the Form) {see 25};

IF a word or charactergroup is marked "Block", THEN UPDATE table "SUI_tempword", SET status="0", WHERE word=(the specific word in the Form) {see 26};

IF a word or charactergroup is marked "Delete", THEN DELETE from table "SUI_tempword" the row WHERE word=(the specific word in the Form);

This completes the output query and Task 5 {see 28}.

DRAWING 04.

Drawing 04 displays the present invention's final Task 6 in the word loader or source text word extraction process. In Task 6 both the accepted and blocked words are being transferred from the "SUI_tempword" table {see 3} into the actual Syllabus Vocabular Table, named "SUI_vocab" table {see 4} of the syllabus, which contains all words contained in the vocabulary of the specific syllabus.

TASK 6: INSERT New Words into Table "SUI_Vocab", and Create Lesson Groups.

First, the present invention sets two variables: ROWSTART and ROWEND {see 29}, where ROWSTART is set to the value 1, and ROWEND is set to the value 24.

Note: The present invention does this, because it is preferred to group 24 words maximum into a single student word drill exercise. The maximum number of words grouped into a student exercise is not determinative of the present invention. The inventor considers a group of 24 words a preferred means. 24 Words are a volume of words that an average student can commit to memory and master individual word reading fluency in a 24 to 48 hour period. This means that after a maximum of two days of exercising these 24 words, the student is able to read the section of the source text pertaining to these 24 words. A maximum of two days thereafter, the student will be able to read both the aforementioned first section, plus a new, subsequent, section of the source text. And so on. Such progress typically enhances student motivation.

Next, the present invention creates a LOOP routine which contains the steps displayed in drawing 04 {see 31} through {see 37}. The LOOP starts at Drawing 04 {see 30} and the LOOP ends at drawing 04 {see 38}.

Next, the present invention creates an Array of 24 numbers (1 through 24) {see 31}. This Array is needed to enable assignment of a random sequence number to each of the 24 words: {see 34} and {see 35}. This constitutes a preferred means which allows the words in the actual word drill exercises (see Drawing 05) to be presented in random sequence, instead of in the same sequence of occurrence as in the source text.

Next, the present invention runs an output QUERY, from {see 32} through {see 36}, on the table "SUI_tempword", rendering the first 24 words i.e. rows.

The QUERY is defined as: QUERY all rows of "SUI_tempword", SORT on "id" field, Ascending. Limit output to rows FROM=ROWSTART, TO=ROWEND (see and {see 29}).

Next, the present invention sets a variable, "Lesson Identifier"=01 {see 33}. This "Lesson Identifier" assigns a unique and sequential identifier to each group of 24 words. This, in turn, allows for word drill exercises to be presented in their correct and logical sequence (see Drawing 05).

Next, the present invention sets a sequence variable, named "seq", picking a random number out of the aforementioned array [00100], and deletes that number from the Array (to avoid this same number to be used again) {see 34}.

Next, the present invention is ready to store each of the 24 words {see 35}—one by one—into the table "SUI_vocab". In that process, the present invention include a random color code (random number between 1 and 74). This is done, to couple each word permanently with a specific color (one of 74 different colors) which will be displayed on the word drill exercise screen with the word, to help boost memorization in the word drill exercises. The aforementioned use of color, or the way in which this paragraph suggests to use the color, is not determinative of the present invention, but does constitute a preferred means.

Next, the "DTG" gets appended with the "Lesson Identifier" set in paragraph [00102] {see 35}.

The actual INSERT routine, writing the individual words into the table "SUI_vocab" looks like this:
INSERT word, color, sequence, status, DTG
INTO "SUI_vocab"
queryname.word (=the "word" value in table "SUI_tempword")
RandomRange(1,74) (=a randomizer, picking a random value between 1 and 74)
Variable "seq" (=as defined in paragraph [00103])
status (=the "status" value in table "SUI_tempword")
DTG & "Lesson Identifier" (=the "DTG" value from table "SUI_tempword" appended with the "Lesson Identifier" value as defined in paragraph [00102]).

Next, before a single LOOP routine continues back to LOOP START {see 30}, the next group of 24 rows in the OUTPUT QUERY needs to be defined. For this purpose, the present invention increments or increase the ROWSTART, ROWEND, and "Lesson Identifier" variables with +24, +24, and +1 respectively {see 37}.

Next, once all words in the table "SUI_tempword" are loaded, the QUERY {see 36} and the LOOP {see 38} will be escaped by the present invention.

Next, the present invention empties table "SUI tempword", making it ready for future use.

This completes the Tasks of the present invention related to Component A: Text Loader component. We will now continue with the detailed description of Component B: Word Drill Exercise component, which is depicted on Drawing 05.

DRAWING 05.

The following paragraphs describe a preferred means to present individual words to a student, to drill or exercise. The said preferred means is not the only means, as the presentation of individual words can be done in manifold ways. For example: Words to be practised can be presented in groups of two, or three, or six, or any other number. Words to be practised can be presented in rows, or columns, or scattered randomly on the display, or in a circle, or any other form of organization. Words to be practised can be combined with colors {see 45}, or figures, or shapes {see 45}, or images, to help augment memorization using the student's associative memory potential. Words to be practised can be set in any font, serif or sans-serif, any font size, large or small, any color and on any background color, or varying colors and background colors. The computer skills required in the task of presenting the word drill exercises (Drawing 05) or reading exercises (Drawing 06) are routine for any database-driven web site developer. Any competent web site developer can readily produce a presentation based on Drawing 05 and Drawing 06, when enjoying access to table "SUI_source" and table "SUI_vocab", if the said tables have been loaded with data using the present invention.

Task: Present the Word Drill Exercise.

When the table "SUI_source" and table "SUI_vocab" have been filled with data (source texts, and syllabus unique vocabulary respectively) through the processes described in paragraphs [0059] through [00111], the present invention is able to present individual words in a manner allowing the student to drill or exercise these words such that the student will attain reading fluency through committing these words and their pronounciation to memory. Drawing 05 displays a preferred means of the Task of constructing and presenting word drill exercises.

The student is offered a list of all source text based lessons, through a query on the table "SUI_vocab". The query output displays available lessons sorted by the "DTG" field, including their titles extracted from "SUI_source" "text_title" values. An example of the required query of "SUI_vocab" and sub-query of "SUI_source" follows directly below.

First, the "SUI_vocab" is queried for the available lessons. Starting at [0097] it was explained that a single source text, if containing more than 24 new words (i.e. not yet found to be present in the "SUI_vocab" table), results in multiple lessons. Multiple lessons based on the same source text are identified within table "SUI_vocab" by the "DTG" value, where the "SUI_vocab" "DTG" value matches the source text "SUI_source" "DTG" value, appended with a sequential "Lesson Identifier" (per lesson, i.e. group of 24 words). Review paragraphs [00105] and [00106]. Hence, the query of "SUI_vocab" is GROUPED BY "DTG". The required main query, querying "SUI_vocab" is:
SELECT "DTG"
FROM "SUI_vocab"
GROUP BY "DTG"
ORDER BY "id" ASC
Embedded in the said query is the following sub-query of table "SUI_source", with the objective to extract the "text_title" field. Before the execution of this subquery, a "variable.coreDTG" needs to be set, where "variable.coreDTG"=the "SUI_vocab.DTG" value extracted at the said main query, with the said "Lesson_Identifier" (see [00106]) stripped off.:
SELECT "text_title"
FROM "SUI_source"
WHERE DTG="variable.coreDTG"
The output of the main query on "SUI_vocab" is now rendered and presented as a series of HyperText Markup Language (HTML) links, each representing a word exercise lesson. An example of the said link(s) is:
<a href="exercise.cfm?dtg=#SUI_vocab.DTG#>#SUI_source.text_title#</a>
Where the values sandwiches between the # signs are dynamic values, generated by the said main query on the table "SUI_vocab" and sub-query on the table "SUI_source".

When the student clicks the link pertaining to the lesson of choice, the "SUI_vocab" table is called and queried, {see 41} and {see 44}, for all words that contain "DTG" matching the "DTG" of the source text i.e. lesson selected by the student: The "DTG" being parsed as a URL variable "DTG" in the HTML link described in paragraph [00113] above. The query is limited to words with "SUI_vocab" table field "status" value="1", to assure that only relevant words are presented and irrelevant or blocked words with "SUI_vocab" table field "status" value="0" are blocked (that is: skipped and not used or displayed in the word drill exercise). Review paragraphs [0093] and [0094] for more details on the "status" field value. The preferred means of sorting, or ordering, the output is by the "sequence" field value, as this results in a random sequence (in relation to the word occurance sequence in the source text), but yet a sequence that will consistently be the same for this specific word drill exercise. See paragraph [00103] for more details on the "sequence" field. An example of the query follows below:
SELECT * (i.e. ALL)
FROM "SUI_vocab"
WHERE DTG=#url.DTG#
ORDER BY sequence A preferred means of producing the layout of a fully functional word drill exercise is described below. Note, the present invention is not determined by the layout of choice, but rather by the method to teach a dyslexic student how to read, using individual word exercises based on custom source text, and this within days of commencing the student's training.

The query output described in [00114] output is limited to groups of six words {see 41}. This limit of six words is a preferred means, but is not determinative for the present invention.

The said six words are then presented in a regular sentence layout {see 42} in a medium sized font, and using a screen contrast that is moderate (less than maximum) to aid the readability for dyslexic students (high contrast representation presents visual processing difficulties for students impaired by dyslexia). A preferred means is a light blue background, with a dark grey color for the fonts.

The student can mouseover each individual word, (see mouse at {see 45}), and have this word presented in a large-font fashion in the open space above the sentence {see 46}. At the same moment a human teacher, or Text to Speech (hereafter: US) synthesizer {see 43}, pronounces the word that is mouseover-ed {see 45}. The programming techniques for the display needs described in this paragraph [00118] are general and obvious to any Hypertext Markup Language (HTML), Cascading Style Sheet (CSS), and Javascript programmer and are commonly used on the majority of web sites and wholly fall outside the scope of the present invention.

The student repeats the word verbally: As a parrot—going back and forth between the teacher or US pronouncing the word, and the student parroting the word. This process is repeated for each and every of the six words.

A preferred means to display the words is to augment the words with colors {see 45}: a unique color for each word. The color-word combination remains always fixed, as a result of the action described in paragraph [00104] {see 35}, namely: color=RandomRange(1,74). The colors will help trigger associative memory of the word and exercise page, making it easier for the student to commit the word-pronunciation combination to memory.

A preferred means is to display the said colors [00120] in or as unique shapes, coupled to each of the unique 74 colors described in paragraph [00104]. Example: Bright red is presented in or as a square; Ecru is presented in or as an elipse; Olive Green is presented in or as a pentagon; Etcetera.

This completes the description of Component B of the present invention. In the following paragraphs Component C is described in detail under the header DRAWING 06.

DRAWING 06.

Component C of the present invention is responsible for the presentation of the reading exercises to the student. When all words related to an entire source text have been exercised, with the student demonstrating fluency in reading all individual words, the student is ready to be presented with the original source text, and experience the he/she is able to read this text fluently.

Task: Presenting the Reading Exercise.

Drawing 06 demonstrated a preferred means to present a reading exercise to the student. When the student has completed all word exercise drills {see 49} described in paragraphs [00112] through [00121], the "SUI_source" table is queried for the "sourcetext" field with the same "DTG" field value as the "DTG"-only value (that is: the "DTG" value excluding the "Lesson Identifier" suffix) of the word drill exercise {see 50}. Thw said "DTG" is parsed forward in a URL variable in a preferred means conceptually similar to that described in paragraph [00113]. An example of this query is:

SELECT sourcetext
FROM SUI_source
WHERE DTG=#url.DTG#

A preferred means to layout the exercise is presented in Drawing 06. The present invention is not determined by the layout of choice, but rather by the method to teach a dyslexic student how to read, using individual word exercises based on custom source text.

The source text is presented in a preferred font size, and font type, and font color, set against a preferred background color, cumulatively creating an easy to read text presented in medium contrast to avoid high-contrast readability challenges for readers with dyslexia. A preferred means is a light blue background, with a dark grey color for the fonts {see 47}.

The student can now read aloud the text that is presented. If desired, the student can choose to listen to the text {see 47} using Text to Speech (hereafter: TTS) {see 48}, or ask the teacher to read the said text {see 47} out loud. When demonstrated reading fluency of the said text is insufficient, the student can return to the word drill exercises related to this source text (described in detailed in the paragraphs [00112] through [00121]).

What is claimed is:

1. A method of teaching a user to read, comprising the steps of:
   (a) providing a user, a processing unit, and a user vocabulary table;
   (b) selecting a source text, the source text being at least a portion of reading material that the user is expected to read;
   (c) the processing unit comparing each word in the source text with the vocabulary table and identifying lesson words, the lesson words being those words found in the source text, but not in the vocabulary table;
   (d) the processing unit adding the lesson words to the vocabulary table;
   (e) the processing unit presenting at least one word drill exercise for each word of the lesson words on a screen, the drill exercise for each lesson word combining textual presentation of the word together with an audible presentation of the pronunciation of the word;
   (f) the user exercising the lesson words using the word drill exercises;
   (g) presenting the source text to the user to read; and
   (h) Repeating steps (b) through (g) with a new source text sequentially expanding the reading vocabulary of the user.

2. The method as set forth in claim 1, whereby the user is offered the ability to learn, or improve skills in, a language other than the user's primary language.

3. The method as set forth in claim 1, wherein step (c) further includes the step of removing some of the unique words from the lesson words.

4. The method as set forth in claim 1, wherein step (g) occurs immediately following step (f).

5. The method as set forth in claim 1, in which each word in the vocabulary table is tagged with an identifier specifying the source text as the source of the word.

6. The method as set forth in claim 1, in which step (g) is also performed at any time prior to completion of step (f).

7. The method as set forth in claim 1, in which textual presentation of the word and audible presentation of the pronunciation of the word takes places simultaneously.

* * * * *